United States Patent [19]
Defatte

[11] Patent Number: 5,960,688
[45] Date of Patent: Oct. 5, 1999

[54] BOX TURNING TOOL FOR AUTOMATIC SCREW MACHINE

[75] Inventor: Robert G. Defatte, Campbellsport, Wis.

[73] Assignee: Diversified Machining, Inc., Fond du Lac, Wis.

[21] Appl. No.: 08/950,079

[22] Filed: Oct. 14, 1997

[51] Int. Cl.[6] .............................. B23B 3/00; B23B 29/00
[52] U.S. Cl. .............................. 82/117; 82/123; 82/152; 82/157; 82/158; 82/161
[58] Field of Search .............................. 82/110, 117, 123, 82/152, 156, 157, 158, 161; 407/118, 119

[56] References Cited

U.S. PATENT DOCUMENTS

| | | | |
|---|---|---|---|
| 1,864,046 | 6/1932 | Lange | 82/157 |
| 3,491,628 | 1/1970 | Head | 82/157 |
| 3,636,805 | 1/1972 | Somma et al. | 82/157 |
| 4,986,151 | 1/1991 | Horn | 82/157 |

OTHER PUBLICATIONS

Exbibit A—Speed and Feed Charts for Greenlee Automatic Screw Machines showing endworking attachments thereon.
Exhibit B—page from W. A. Whitney Co. catalog showing endworking attachment with high speed cutting tool.

Primary Examiner—Andrea L. Pitts
Assistant Examiner—Toan Le
Attorney, Agent, or Firm—Donald Cayen

[57] ABSTRACT

A box turning tool for a Greenlee automatic screw machine with a conventional endworking attachment uses a conventional indexable carbide insert to produce proper cutting action on a workpiece. The box turning tool has a shank clamped in the endworking attachment. The shank has an insert seat that lies in a transverse plane that makes an angle of approximately 83 degrees with a central longitudinal plane defined by the shank. The indexable carbide insert cutting edge is mounted to the shank insert seat such that a cutting edge is inherently parallel to a horizontal plane passing through the longitudinal axis of the automatic screw machine spindle and the workpiece. The shank is adjusted in the endworking attachment to bring the carbide insert cutting edge into coincidence with the horizontal plane through the automatic screw machine longitudinal axis. The shank can be formed to locate the carbide insert such that the cutting tip thereof leads or trails the cutting edge.

20 Claims, 5 Drawing Sheets

BOX TURNING TOOL FOR AUTOMATIC SCREW MACHINE

BACKGROUND OF THE INVENTION

This invention pertains to machine tools, and more particularly to apparatus for turning and facing workpieces in automatic screw machines.

DESCRIPTION OF THE PRIOR ART

Machinery for removing material from rotating workpieces is well known. For example, horizontal lathes of many variations are very common and have been in widespread use for years.

A particularly popular type of horizontal lathe is the automatic screw machine. Automatic screw machines are capable of very high production rates, because multiple tools can operate on the workpiece simultaneously. The Greenlee Company of Rockford, Ill., has manufactured a large number of automatic screw machines, many of which are currently in operation. Other manufacturers of automatic screw machines include Brown & Sharpe, Acme-Gridley, and New Britain-Gridley.

When automatic screw machines, such as the Greenlee automatic screw machines, were originally developed, the cutting tools used with them were made of high speed steel. A cutting edge was ground to the required configuration on one end of a tool block. The other end of the tool block was clamped in a tool holder. In turn, the tool holder was part of a turret or other mechanism designed to present the cutting edge to the workpiece. Early high speed steel cutting tools produced long stringy chips, which were highly undesirable.

Figure 1:
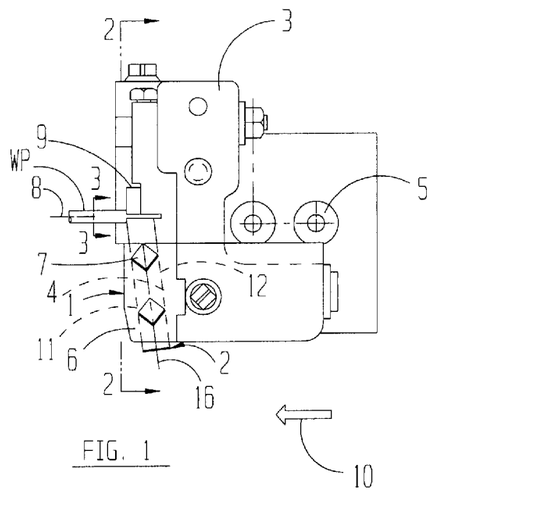
FIG. 1 is a front view of a portion of an automatic screw machine having a conventional endworking attachment to which is clamped a prior high speed steel cutting tool for machining a workpiece.
Figure 2:
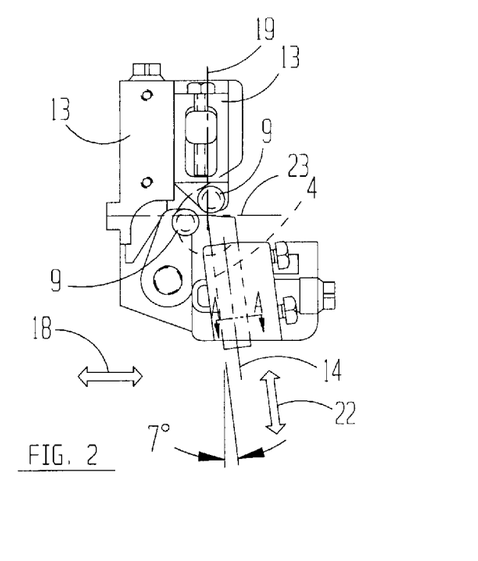
FIG. 2 is a cross sectional view taken along line 2—2 of FIG. 1.

A very common mechanism used with Greenlee and some other automatic screw machines for holding cutting tools is an endworking attachment such as that shown at reference numeral 1 in FIGS. 1 and 2. The endworking attachment is comprised of a body 3 that is secured to the machine turret or other feed component of the automatic screw machine by fasteners 5. A high speed steel cutting tool 2 is clamped by set screws 7 in a recess 4 of a tool holder 6. The tool holder 6 is part of the endworking attachment 1. The cutting tool 2 is adjusted by the machine operator to properly cut the workpiece WP. The workpiece WP is held in a chuck, not shown, for rotation about a horizontal axis 8 of the machine spindle. Feeding the endworking attachment in the direction of arrow 10 machines the workpiece in a turning operation. Accordingly, the cutting tool has a leading side 11 and a trailing side 12. The depth of cut is controlled by adjusting the cutting tool in the cross-feed directions of arrows 18, which are parallel to a horizontal plane 23 passing longitudinally through the spindle axis 8. Follower rollers 9 on respective adjustable arms 13 help support the workpiece.

Figure 2A:
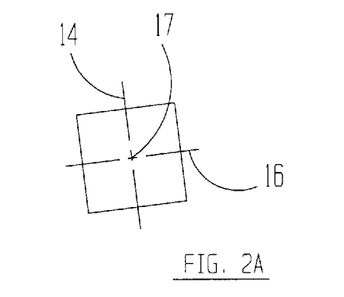
FIG. 2A is a view taken along line A—A of FIG. 2.
Figure 3:
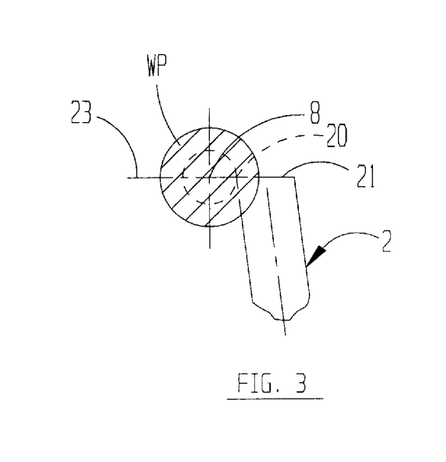
FIG. 3 is a simplified cross sectional view taken along line 3—3 of FIG. 1.
Figure 4:
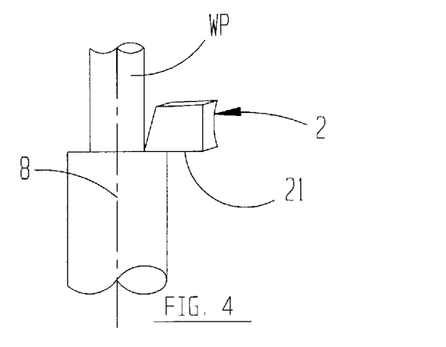
FIG. 4 is a top view of FIG. 3.

The cutting tool 2 defines a central longitudinal plane 14 and a central transverse plane 16. Also see FIG. 2A. The intersection of the planes 14 and 16 define a longitudinal axis 17 of the cutting tool. It will be noticed in FIG. 2 that the central longitudinal plane 14 of the cutting tool is not perpendicular to the directions of the cutting tool cross-feed, arrows 18. Rather, the central longitudinal plane 14 makes a seven degree angle with a vertical plane 19 passing through the spindle axis 8. That angle is a function of the tool holder recess 4. The tool holder 6 is designed with the seven degree angle to provide adequate front clearance between the tool cutting edge 21 and the workpiece WP. Also see FIGS. 3 and 4.

It is well known that for turning a workpiece WP on a production basis, it is highly important that the cutting edge 21 of the cutting tool 2 be coincident with a plane passing longitudinally through the center of rotation of the workpiece, that is, through the automatic screw machine spindle axis 8. For convenience and practicality, the preferred longitudinal plane is the horizontal plane 23. Consequently, high speed steel cutting tools used with the endworking attachment 1 were ground in the manner shown in FIG. 3. The cutting tool was adjusted in the directions of arrows 22 and clamped in the tool holder recess 4 such that the cutting edge 21 lay within the horizontal plane 23. The cutting tip 20 then inherently lay in the plane 23. Subsequent adjustment of the cutting tool in the directions of arrows 18 do not move the location of the cutting edge 21 and cutting tip 20 outside of the plane 23.

Figure 5:
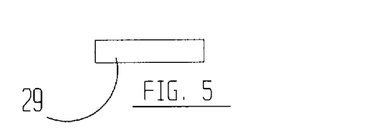
FIG. 5 is a front view of a conventional indexable carbide insert.
Figure 6:
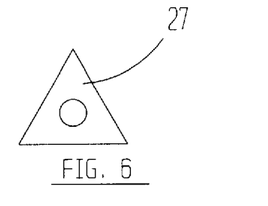
FIG. 6 is a top view of FIG. 5.
Figure 7:
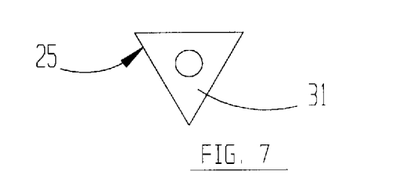
FIG. 7 is a bottom view of FIG. 5.

The advent of carbide cutting tools brought increased production and broken-up chips compared with high speed steel cutting tools. Carbide cutting tools are often in the form of replaceable and indexable inserts. A particularly popular replaceable carbide insert 25 is shown in FIGS. 5–7. The insert 25 has six cutting edges, three at the intersections of one face 27 with the three side edges 29, and three more at the intersections of the other face 31 with the three side edges.

It is highly desirable that carbide cutting tools, such as the carbide insert 25, be used in automatic screw machines. Consequently, it is known to replace the high speed steel cutting tool 2 of FIGS. 1–4 with a carbide cutting insert 25 mounted by a screw 35 on a shank 33 to make a box turning tool 37. See FIGS. 8 and 9. The prior shank 33 has a longitudinal centerline 34 and a flat end surface 36 on which the insert 25 is placed. The end surface 36 is perpendicular to the longitudinal centerline 34. The insert is guided on the shank by V-shaped walls 38 that open into a circular recess 40. The carbide insert is indexable in the shank walls 38 as the various cutting edges wear.

Figure 8:
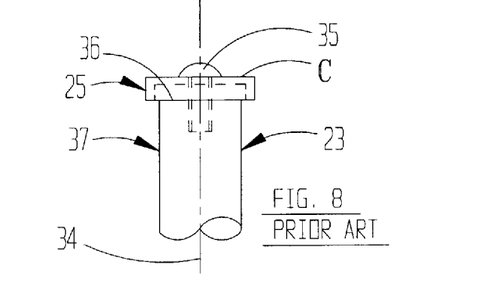
FIG. 8 is a front view of a prior box turning tool used with the endworking attachment and automatic screw machine of FIGS. 1 and 2.
Figure 9:
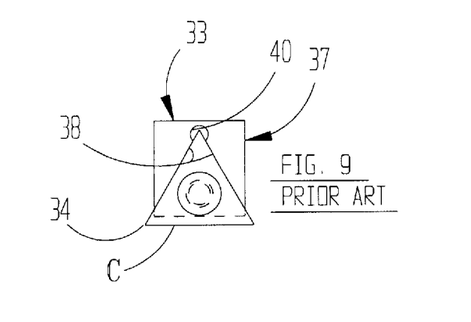
FIG. 9 is a top view of FIG. 8.

However, merely substituting the prior box turning tool 37 of FIGS. 8 and 9 for the high speed steel cutting tool 2 of FIGS. 1 and 2 in the endworking attachment 1 of Greenlee automatic screw machines has been unsatisfactory. That is because the cutting edge C of the carbide insert 25 (as shown in FIGS. 8 and 9) cannot be brought into coincidence with a longitudinal plane through the spindle axis 8. No amount of adjusting in either the directions of arrows 18 or arrows 22 will bring the cutting edge C into coincidence with a longitudinal plane through the spindle axis. Specifically, the cutting edge C always makes an angle of seven degrees with the horizontal plane 23. See FIG. 10. It is possible, of course, to place the cutting tip 20 within the longitudinal plane 23. However, that does not alleviate the problems produced because of the location of the cutting edge C outside of the plane 23.

Figure 10:
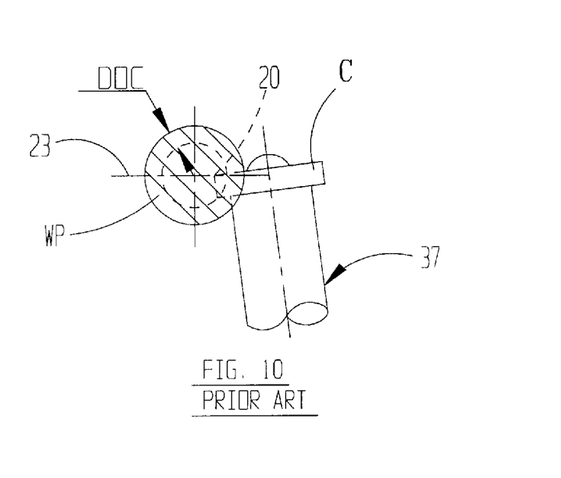
FIG. 10 is a view generally similar to FIG. 3, but showing the prior box turning tool of FIGS. 8 and 9 in operation turning a workpiece on a Greenlee automatic screw machine with an endworking attachment.
Figures 10, 21:
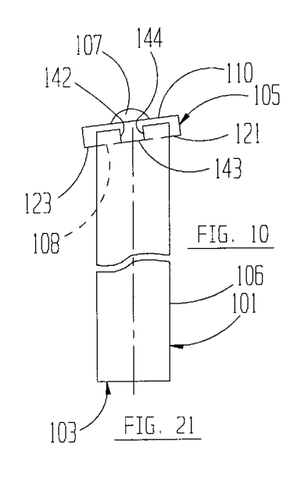
FIG. 21 is a second side view of the invention.
Figure 11:
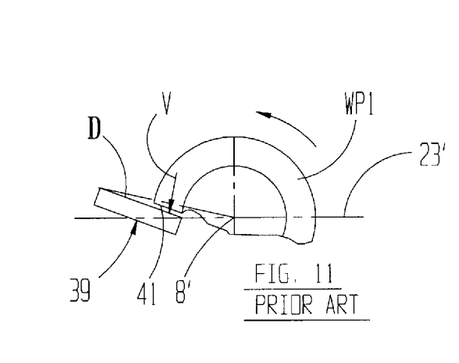
FIG. 11 is a schematic view on an enlarged scale showing the cutting action of a rotating workpiece produced by the prior box turning tool of FIGS. 8 and 9.

Turning or facing a workpiece WP on a Greenlee automatic screw machine with the box turning tool 37 of FIGS. 8 and 9, as shown in FIG. 10, is not acceptable unless the depth of cut DOC is very small. That is because the indexable carbide insert cutting edge C does not produce a pure shearing force on the workpiece. FIG. 11, which for clarity is enlarged in size and reversed in orientation from FIG. 10, shows that the cutting edge D of an insert 39 is not coincident with a longitudinal plane 23' through the machine spindle axis 8. The velocities of all the portions of the rotating workpiece are always in directions perpendicular to planes passing longitudinally through the spindle axis 8'. Accordingly, the velocities V of all the points along the surface 41 of the workpiece that are in instantaneous contact with the insert cutting edge D are also perpendicular to planes passing longitudinally through the spindle axis.

However, since the cutting edge D is not within such a longitudinal plane, such as plane 23', there is a component of velocity for each point on the surface 41 that is parallel to and along the cutting edge and directed into the workpiece. That component of velocity tends to force, by friction, the cutting tip radially into the workpiece. The result is a rubbing of the workpiece on the cutting edge rather than a pure shearing action, as well as a tendency for the cutting tip to dig into the workpiece. At production rates, chatter is introduced into the automatic screw machine, and the indexable carbide insert quickly burns. Accordingly, the advantages of using carbide cutting inserts in automatic screw machines that should occur, such as increased production and broken-up chips, have not been realized. In fact, in some instances, using carbide box turning tools 37 results in decreased performance relative to high speed steel cutting tools 2 (FIGS. 1 and 2).

Figure 12:
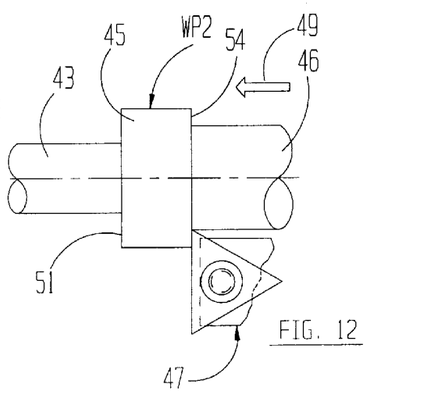
FIG. 12 is a view of a first typical workpiece being turned using the prior box turning tool.
Figure 13:
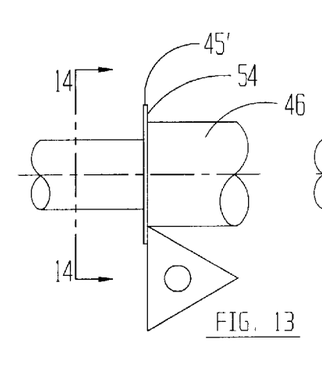
FIG. 13 is a view similar to FIG. 12, but showing the prior box turning tool approaching the end of a turning operation.
Figure 14:
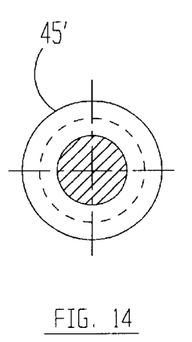
FIG. 14 is a cross sectional view taken along line 14—14 of FIG. 13.
Figure 15:
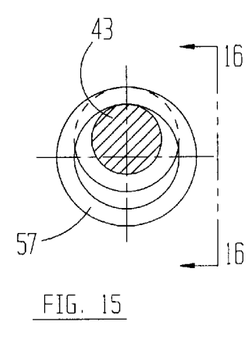
FIG. 15 is a view similar to FIG. 14, but showing a ring of material created at the end of the turning operation of FIGS. 12 and 13.
Figure 16:
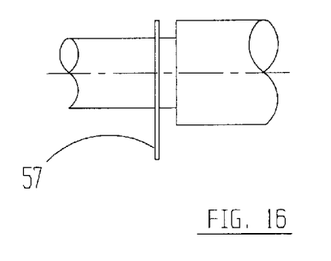
FIG. 16 is a view taken along line 16—16 of FIG. 15.

A further problem related to the use of prior carbide box turning tools in all automatic screw machines is illustrated in FIGS. 12–16. In FIG. 12, a workpiece WP2 has a section 43 that was previously turned to a desired diameter. A second section 45 is to be turned in the direction of arrow 49 to a second diameter 46 that is equal to or greater than the diameter of the section 43. Accordingly, the box turning tool 47 exerts a cutting force in the direction of arrow 49 on the workpiece face 54 in the usual manner. However, because of the higher feeds and speeds used with carbide cutting inserts, the cutting forces are greater than with the prior high speed steel cutting tools 2. As the box turning tool 47 approaches the face 51 of the workpiece section 45, FIG. 13, the cutting force exerted on the surface 54 is resisted only by a thin band of material having the width of the remaining section 45' of unmachined material and the diameter of the section 46. Ultimately, the cutting force on the surface 54 causes the remaining band 45' to tear loose from the workpiece WP2 and become a loose ring 57. The ring 57 falls onto the section 43, where it remains. The ring is highly detrimental to further operations on the workpiece, because the ring interferes with the tools that perform the subsequent operations.

Figure 17:
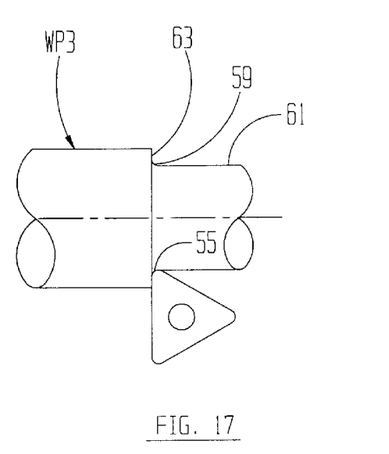
FIG. 17 is a view of a second typical workpiece being turned using the prior box turning tool.
Figure 18:
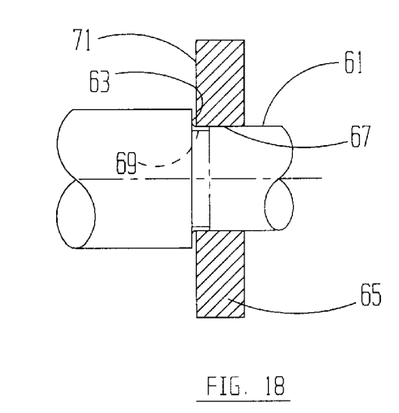
FIG. 18 is a view similar to FIG. 17, but showing a part assembled to the workpiece.
Figure 19:
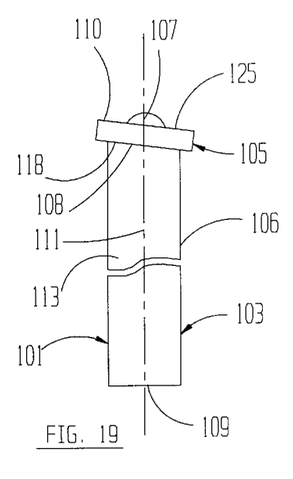
FIG. 19 is a first side view of the box turning tool of the invention.
Figure 20:
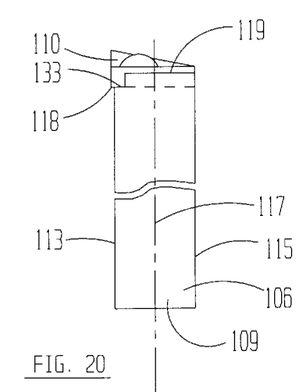
FIG. 20 is a front view of the box turning tool of the invention.

Another common problem associated with prior turning operations is that of machining a right angle corner between a cylindrical portion of a workpiece and a face that intersects the cylindrical portion. Referring to FIG. 17, a radius 59 is invariably left on a workpiece WP3 at the intersection of a cylindrical surface 61 and a face 63. That is because the cutting tip, such as cutting tip 55 in FIG. 12, is never a sharp point but must always have a bevel or radius. As a result of the radius 59, a part 65 having an internal diameter 67 substantially equal to the outer diameter of the cylindrical surface 61 and a right angle face 71 cannot be placed on the workpiece cylindrical surface 61 such that the part face 71 is flat against the workpiece face 63. In order for the part face 71 to be in flat facing contact with the workpiece face 63, past practice has been to form a shallow relief, represented by phantom lines 69, in the cylindrical surface 61 at the junction of the face 63. Although the relief 69 solves the problem created by the radius 59, it creates its own problems by requiring a second machining operation and by weakening the workpiece in the plane of the relief.

Thus, a need exists for a way to successfully integrate carbide cutting tools into automatic screw machines.

SUMMARY OF THE INVENTION

In accordance with the present invention, a box turning tool is provided that enables indexable carbide inserts to properly machine workpieces in automatic screw machines. This is accomplished by apparatus that includes a shank having a uniquely oriented insert seat to provide proper cutting action on a workpiece when the box turning tool is clamped in an endworking attachment.

The box turning tool of the invention requires no modifications of any kind to the automatic screw machine, to the endworking attachment, or to the indexable carbide insert. The benefits of the invention are achieved because the insert seat is oriented at a angle that compensates for the angle of the recess in the endworking attachment. The insert seat makes the angle with a central longitudinal plane of the shank. The shank also defines a central transverse plane that is perpendicular to the longitudinal plane. The shank longitudinal plane is parallel to the longitudinal axis of the automatic screw machine spindle when the box turning tool is clamped in the endworking attachment and the endworking attachment is secured to the automatic screw machine. The longitudinal plane thus extends between leading and trailing sides of the shank. In the case of use with a Greenlee automatic screw machine, the shank insert seat lies in a plane that makes an angle of 83 degrees with the shank central longitudinal plane when the shank is clamped in an endworking attachment and the endworking attachment is secured to the machine. The plane of the shank insert seat is inherently parallel to a horizontal plane through the machine spindle axis. Further, the shank is so constructed that when a conventional indexable carbide insert is mounted on the insert seat, the insert cutting edge is coincident with the horizontal plane through the machine spindle axis. Accordingly, the indexable carbide insert is in a proper position for machining the workpiece with correct cutting action, and all rubbing and other detrimental conditions caused by the prior carbide box turning tools are eliminated.

To accurately locate the indexable carbide insert on the shank insert seat, the end of the shank is formed with a pair of walls that upstand from the insert seat. The two walls define respective guide surfaces that are symmetrical about a longitudinal centerline of the insert seat. The guide surfaces are perpendicular to the plane of the insert seat. According to one aspect of the invention, the insert seat longitudinal centerline is parallel to the shank central longitudinal plane. The insert seat longitudinal centerline may but need not lie within the shank central longitudinal plane. Each wall has a first guide surface that is parallel to the insert seat longitudinal centerline. The first guide surfaces extend from the shank trailing side and terminate at respective points at a predetermined distance from the shank trailing side. From their respective terminal points, the two guide surfaces diverge at an included angle of 60 degrees. The divergent guide surfaces are so located that a conventional indexable carbide insert placed on the insert seat and located by the guide surfaces has a cutting edge thereon that overhangs the shank leading side. A tapped hole in the insert seat receives a screw that mounts the insert to the shank.

When the shank is clamped in an endworking attachment, which in turn is secured to the automatic screw machine, the indexable carbide insert cutting edge is perpendicular to the machine spindle axis. The box turning tool is adjusted to place the indexable carbide insert cutting edge coincident with the horizontal plane through the machine spindle. Consequently, the insert inherently produces proper cutting action on the workpiece without further attention from the machine operator.

Further in accordance with the present invention, the guide surfaces of the shank insert seat can be symmetrical about a longitudinal centerline that is not parallel to the shank central longitudinal plane. Rather, the insert seat longitudinal centerline can make a slight angle, such as approximately one degree to five degrees, with the shank central longitudinal plane. The insert seat longitudinal centerline may be such that the cutting tip of an indexable carbide insert mounted in the shank leads the insert cutting edge as the box turning tool is fed along the workpiece. Alternately, the insert longitudinal centerline may be oriented such that the insert cutting tip trails the insert cutting edge. In the first case, turning a workpiece in an automatic screw machine results in a slight undercut in the workpiece face at the junction thereof with the surface being turned. The undercut enables another part having a bore with a face at a right angle thereto to be placed on the workpiece turned surface and flat against the workpiece face without having to perform a secondary relief operation on the workpiece.

The case of the insert cutting tip trailing the rest of the insert cutting edge eliminates the problem of a ring being created when turning a first diameter into a second smaller diameter. The insert cutting edge cuts the workpiece face obliquely such that the workpiece material farthest from the spindle axis is cut before the material radially inwardly at the insert cutting tip. The thickness of the band of material adjacent the junction of the surface being turned and the adjacent face is therefore greater than the band thickness radially farther away from the spindle axis. The depth of cut constantly diminishes as the insert cutting edge approaches the end of the cut, along with a corresponding decrease in the cutting force exerted on the diminishing workpiece face. The cutting tool finishes the turning operation with a clean, gradual, and oblique machining of the face, rather than with a constant force acting against a constant depth of cut. The result is that the cutting edge completes its cut smoothly and without breaking a ring from the workpiece.

The use of a shank insert seat having a longitudinal centerline that is not parallel to the shank central longitudinal plane is not limited to shanks in which the insert seats for the indexable carbide inserts are at the 83 degree angle to the shank central longitudinal planes. Endworking attachments used with some automatic screw machines have tool holder recesses such that central longitudinal planes of the box turning tool shanks clamped in them are perpendicular to the directions of tool cross-feed. When those endworking attachments are used, the shank insert seat is at 90 degrees to the shank central longitudinal plane. The feature of the insert cutting edge trailing or leading the cutting tip, as the case may be, is available to such endworking attachments.

The method and apparatus of the invention, using a shank having a unique geometry, thus enables conventional indexable carbide inserts to be used in automatic screw machines. The inserts are easily adjustable for correct cutting action on a workpiece, even though the box turning tool is used with a standard endworking attachment.

Other advantages, benefits, and features of the present invention will become apparent to those skilled in the art upon reading the detailed description of the invention.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 19–22, a box turning tool 101 is illustrated that includes the present invention. The box turning tool 101 is particularly useful for turning and facing workpieces in Greenlee automatic screw machines.

The box turning tool 101 is comprised of a shank 103, a triangular-shaped indexable carbide insert 105, and a screw 107. The indexable carbide insert 105 is conventional, having opposed first and second faces 108 and 110, respectively, and three side surfaces 112, 114, and 116. The intersections of the face 108 with the side surfaces 112, 114, 116 form respective cutting edges 118, 121, and 123. The intersections of the face 110 with the side surfaces form cutting edges 125, 127, and 129. The cutting edges 125 and 127 intersect at a first cutting tip 131. The cutting edges 125 and 129 intersect at a second cutting tip 132. There is a central hole through the indexable carbide insert between the two faces 108 and 110.

The shank 103 has a first end 109 and a generally rectangular cross section. Typical sizes for the shank cross section are 0.38 inches and 0.50 inches square. The shank has a leading side 113, a trailing side 115, and opposed connecting sides 106. The shank defines a central longitudinal plane 111 that extends between the leading and trailing sides 113 and 115, respectively. The shank further defines a central transverse plane 117 that is perpendicular to the central longitudinal plane 111. The shank has a second end 119 opposite the first end 109.

In accordance with the present invention, an insert seat 133 in the shank second end 119 makes an angle of 83 degrees with the central longitudinal plane 111. The insert seat 133 is recessed into the second end 119 for a depth less than the distance between the indexable carbide insert faces 108 and 110. The indexable carbide insert 105 is guided on the shank insert seat by a pair of guide walls 135 and 137. The guide walls 135 and 137 define respective guide surfaces 139 and 141 that are symmetrical about a longitudinal centerline 143. In the box turning tool 101 of FIGS. 19–22, the longitudinal centerline 143 lies within the shank central longitudinal plane 111. The guide surfaces 139 and 141 extend from the shank trailing side 115 along parallel surfaces 142 and 144, respectively, that are parallel to the insert seat longitudinal centerline 143. The parallel surfaces 142 and 144 terminate at respective points 145 and 147. From the terminal points 145 and 147, the guide surfaces extend along respective surfaces 149 and 151 that diverge at an angle of 60 degrees toward the shank connecting sides 106. The divergent surfaces 149 and 151 are so located that one cutting edge of the indexable carbide insert, such as cutting edge 125, overhangs and is parallel to the shank leading side 113. The cutting tips 131 and 132 also overhang the shank leading and connecting sides. The carbide insert is removably mounted to the shank by the screw 107.

Figure 25:
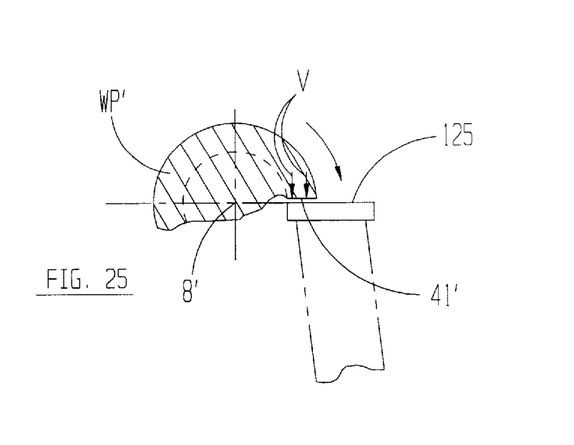
FIG. 25 is a view similar to FIG. 10, but on an enlarged scale and showing a workpiece being turned with the box turning tool of the invention.

In use, the shank 103 of the box turning tool 101 is clamped in the tool holder of an endworking attachment 1 of a Greenlee automatic screw machine in the usual manner. See FIGS. 23 and 24. For clarity in FIGS. 23 and 24, the workpiece is not shown. The cutting edge 125 of the indexable carbide insert 105 is inherently parallel to the horizontal plane 23 through the axis 8 of the machine spindle. By adjusting the location of the box turning tool in the directions of arrows 153, the cutting edge 125 is brought into coincidence with the plane 23. Consequently, the carbide insert is positioned for proper cutting of the workpiece as is shown in FIG. 25. In FIG. 25, the velocities v of all the points on the workpiece surface 41' that are in instantaneous contact with the carbide insert cutting edge 125 are in a direction perpendicular to the carbide insert cutting edge. As a result, the cutting action produced by the cutting edge 125 on the workpiece surface 41' has no component toward or away from the spindle axis 8'. The result is proper cutting action and the elimination of rubbing, chatter, and other detrimental machining characteristics produced by the prior box turning tool 37.

Figure 22:
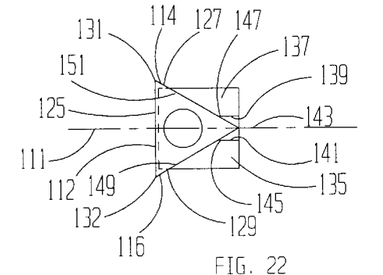
FIG. 22 is a top view of FIG. 20.
Figures 22A, 23, 24:
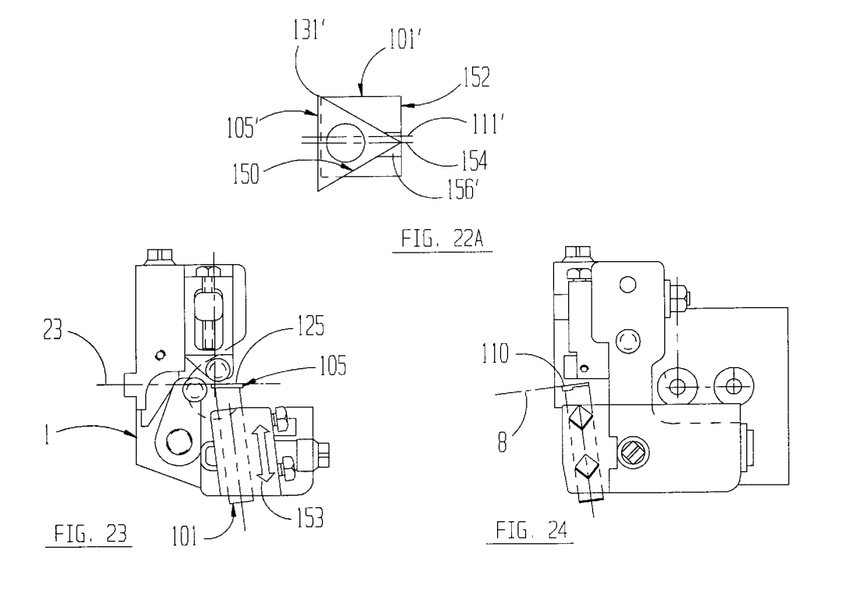
FIG. 22A is a view similar to FIG. 22, but showing a shank having a variation of the guide surfaces for the indexable carbide insert.
FIG. 23 is a view similar to FIG. 2, but showing the box turning tool of the invention in use in a Greenlee automatic screw machine with an endworking attachment.
FIG. 24 is a view similar to FIG. 1, but showing the box turning tool of the invention in use in the automatic screw machine.

It will be noticed in FIG. 24 that the face 110 of the indexable carbide insert 105 is not parallel to the axis 8. Rather, the face 110 makes an angle of approximately seven degrees with the axis 8. Such an angle is a function of the tool holder and is highly desirable, because it provides front clearance to the carbide insert cutting edge 125 and contributes to the efficient use of the box turning tool 101.

In some instances it is desirable to give maximum support to the cutting tip that is in contact with a workpiece. FIG. 22A shows a top view of a box turning tool 101' having a shank 152 with a central longitudinal plane 111'. The guide surfaces 150 for an indexable carbide insert 105' are symmetrical about a longitudinal centerline 154 that is parallel to but displaced from the shank central longitudinal plane 111'. The cutting tip 131' of the inset 105' thus has increased support on the insert seat 156'. In all other respects, the box turning tool 101' is the same as the box turning tool 101 of FIGS. 19–22.

Figure 26:
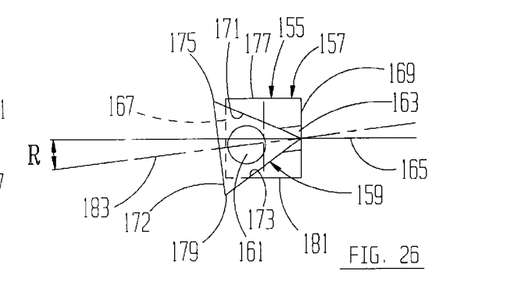
FIG. 26 is a view similar to FIG. 22, but showing a modified box turning tool according to the present invention.

Now turning to FIG. 26, a modified box turning tool 155 is shown. The box turning tool 155 is generally similar to the box turning tool 101 described above in connection with FIGS. 19–25. That is, the box turning tool 155 has a shank 157 and a conventional indexable carbide insert 159 that is mounted by a screw 161 to an insert seat 163 on the shank. The shank 157 defines a central longitudinal plane 165 that extends between leading and trailing sides 167 and 169, respectively, of the shank. The carbide insert 159 is located in the shank by guide surfaces 171 and 173 that are symmetrical about a longitudinal centerline 183. The longitudinal centerline 183 is not parallel to the shank central longitudinal plane 165. Rather, the insert seat longitudinal centerline 183 makes a small angle R of approximately one degree to five degrees with the shank central longitudinal plane. For clarity, the angle R is shown exaggerated. As a result, the insert cutting edge 172 is not parallel to the shank leading side 167. Instead, the insert cutting tip 175 adjacent the shank first connecting side 177 projects further from the shank leading side 167 than the insert cutting tip 179 that is adjacent the shank second connecting side 181.

Figure 27:
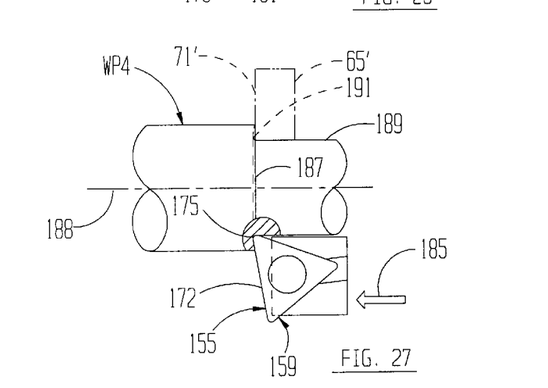
FIG. 27 is a view generally similar to FIG. 12, but showing the first typical workpiece turned by using the modified box turning tool of FIG. 26.

FIG. 27 shows a workpiece WP4 being turned by the box turning tool 155. The indexable carbide insert cutting edge 172 lies in a plane that passes through the axis 188 of the machine spindle and of the rotating workpiece WP4. As the box turning tool 155 is fed in the direction of arrow 185, the cutting tip 175 of the carbide insert 159 leads the rest of the cutting edge 172. Consequently, the face 187 cut on the workpiece is not perpendicular to the machine spindle axis 188. Rather, a slight undercut is machined into the workpiece face 187. The depth of the undercut is preferably at least as great as the radius 191 on the carbide insert cutting tip 175. Later, a second part 65' can be assembled over the workpiece cylindrical surface 189, and the part face 71' can be brought up flat against the workpiece face 187. Because of the undercut, flat facing contact between the part face 71' and the workpiece face 187 is possible even though there is an inherent radius 191 at the insert cutting tip 175. The box turning tool 155 thus eliminates the prior necessity of a second machining operation to compensate for the radius on the carbide insert cutting tip 175.

Figure 28:
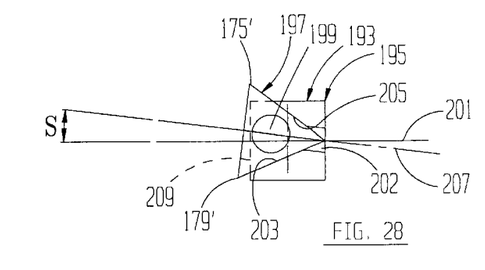
FIG. 28 is a view generally similar to FIG. 22, but showing a further modified box turning tool according to the invention.

Next turning to FIG. 28, a box turning tool 193 has a shank 195, an indexable carbide insert 197, and a screw 199. The shank 195 defines a central longitudinal plane 201. The carbide insert 197 is located on an insert seat 202 in the shank by a pair of guide surfaces 203 and 205 that are symmetrical about a longitudinal centerline 207. The longitudinal centerline 207 of the insert seat 202 makes an angle S of approximately one degree to five degrees with the shank central longitudinal plane 201. Accordingly, the carbide insert cutting tip 175' is closer to the shank leading side 209 than is the cutting tip 179'.

Figure 29:
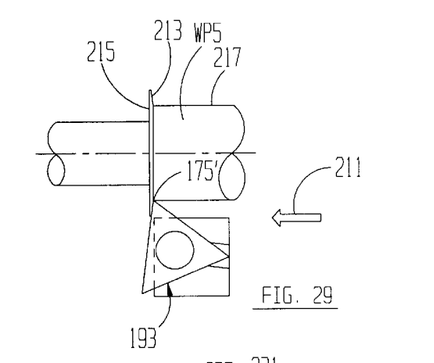
FIG. 29 is a view generally similar to FIG. 13, but showing the second typical workpiece being turned by using the further modified box turning tool of FIG. 28.

FIG. 29 shows the box turning tool 193 in operation to turn a workpiece WP5. As the box turning tool is fed in the direction of arrow 211, an oblique face 213 is cut on the workpiece WP5. When the insert cutting tip 175' approaches the end face 215 of the workpiece section being turned, the last portion of workpiece material is gradually reduced in diameter until the material at the surface 217 is the last to be cut. As a consequence, the surface 217 can be turned completely to the end face 215 without a detrimental ring of workpiece material being broken from the workpiece adjacent the face 215.

Figure 36:
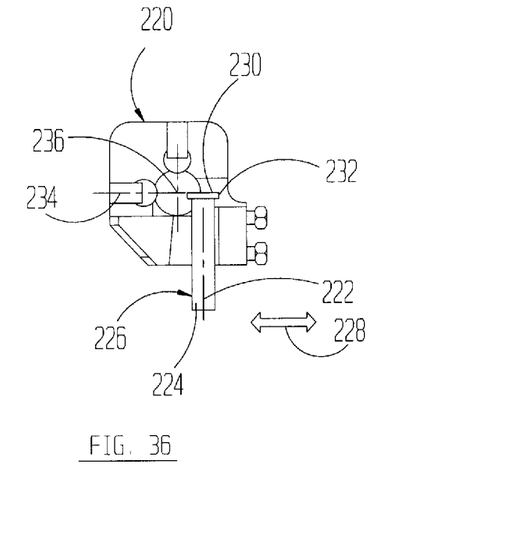
FIG. 36 is a simplified end view of an endworking attachment in which the recess for the cutting tool is perpendicular to the directions of tool cross-feed.

As described, the box turning tools 155 of FIG. 26 and 193 of FIG. 28 have respective insert seats 163 and 202 that are at approximately seven degrees to the planes of the shank central longitudinal planes 165 and 201 in the same manner as the insert seat 133 of the box turning tool 101 of FIGS. 19–22. It is a feature of the invention that the benefits obtained by the box turning tools 155 and 193 regarding the machining operations of FIGS. 27 and 29 are not limited to box turning tools having shank insert seats that are at seven degrees to the shank central longitudinal plane. Referring to FIG. 36, an endworking attachment 220 is depicted that is commonly used on Brown & Sharpe automatic screw machines. For example, the endworking attachment 220 may be manufactured by the Boyar-Schultz Division of the W. A. Whitney Company of Rockford, Ill. The endworking attachment 220 is designed such that the central longitudinal plane 222 of the shank 224 of a box turning tool 226 is perpendicular to the directions of cutting tool cross-feed, arrows 228. Consequently, the cutting edge 230 of an indexable carbide insert 232 can be brought into coincidence with a longitudinal horizontal plane 234 through the automatic screw machine spindle axis 236. In that case, the box turning tool 101 of the present invention, FIGS. 19–22, is not required. However, the advantages of having the longitudinal centerline of the guide surfaces for the insert 232 non-parallel to the shank central longitudinal plane 222 are still highly desirable with the endworking attachment 220.

Figure 30:
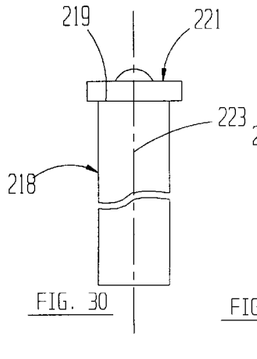
FIG. 30 is a side view of an alternate box turning tool.
Figures 31, 33, 34:
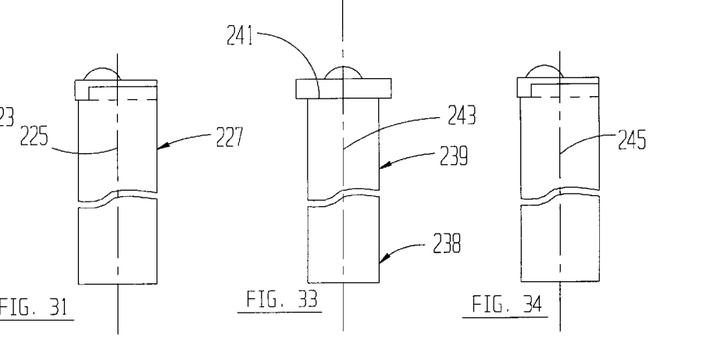
FIG. 31 is a front view of FIG. 30.
FIG. 33 is a side view of another alternate construction of the box turning tool of the invention.
FIG. 34 is a front view of FIG. 33.
Figure 32:
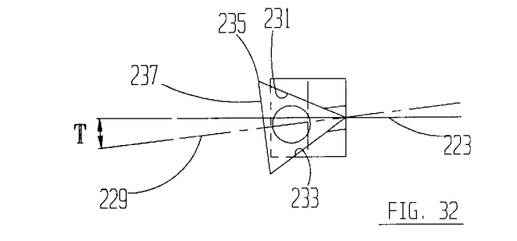
FIG. 32 is a top view of FIG. 31.

In FIGS. 30–32, a box turning tool 218 is shown that accommodates the endworking attachment 220. The box turning tool 218 has an insert seat 219 for an indexable carbide insert 221 that is perpendicular to both the shank central longitudinal plane 223 and the shank central transverse plane 225. The longitudinal centerline 229 for the insert guide surfaces 231 and 233 is not parallel to the shank central longitudinal plane 223. Instead, the longitudinal centerline 229 is at a slight angle T relative to the shank central longitudinal plane 223. (For clarity, the angle T is shown exaggerated.) The insert cutting tip 235 leads the rest of the insert cutting edge 237 during operation in a manner similar to the box turning tool 155 of FIGS. 26 and 27.

Figure 35:
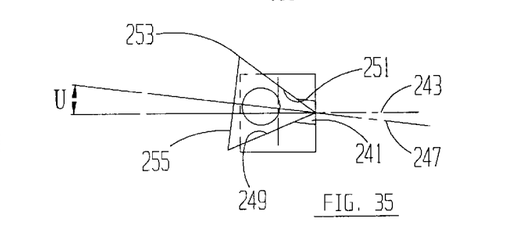
FIG. 35 is a top view of FIG. 34.

In FIGS. 33–35, a box turning tool 238 has a shank 239 in which the insert seat 247 is perpendicular to the shank central longitudinal and transverse planes 243 and 245, respectively. The longitudinal centerline 247 of the shank guide surfaces 249 and 251 upstanding from the insert seat 241 makes a small angle U with the shank central longitudinal plane 243. (For clarity, the angle U is shown exaggerated.) The longitudinal centerline 247 is such that the carbide tip 253 trails the rest of the cutting edge 255 during operation in a manner similar to the box turning tool 193 of FIGS. 28 and 29. Like the box turning tool 218 of FIGS. 30–32, the box turning tool 238 is eminently suited for use with the endworking attachment 220 of FIG. 36. (Persons skilled in the screw machine art will recognize that the Boyar-Schultz Division of the W. A. Whitney Company also manufactures a large model endworking attachment having a tool holder recess that is at seven degrees to the vertical plane 19 through the spindle axis 8, FIG. 2. Thus, the box tools 101 (FIGS. 19–22), 155 (FIG. 26), and 193 (FIG. 28) are used with the large model Boyar-Schultz endworking attachment.)

In summary, the results and advantages of endworking attachments on Greenlee and other automatic screw machines can now be more fully realized. The box turning tool of the invention enables conventional indexable carbide inserts to be used for turning workpieces with proper cutting action but without requiring any modifications to the endworking attachment, the automatic screw machine, or the carbide insert. This desirable result comes from using the combined functions of the box turning tool shank. The shank has an insert seat to which the carbide insert is mounted. The insert seat is at a unique angle relative to the central longitudinal plane of the shank. When the shank is clamped and adjusted in the appropriate endworking attachment, the carbide insert cutting edge is coincident with a plane through the axis of the automatic screw machine spindle. The carbide insert can be located in the shank such that the cutting edge is perpendicular to the automatic screw machine spindle. Alternately, the shank can be formed with guide surfaces for the carbide insert such that the cutting tip leads or trails the cutting edge. If the cutting tip leads the rest of the cutting edge, an undercut is machined in the workpiece face adjacent the turned surface. If the cutting tip trails the rest of the cutting edge, the workpiece face adjacent the turned surface can be machined into a smaller diameter section of the workpiece without breaking a ring of material from the workpiece.

It will also be recognized that in addition to the superior performance of the present invention, its construction is such as to cost no more than traditional box turning tools. In fact, the superior cutting performance of the indexable carbide insert made possible by the box turning tool of the invention amply justifies replacing prior box turning tools with those of the invention.

Thus, it is apparent that there has been provided, in accordance with the invention, a box turning tool for automatic screw machines that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. In an automatic screw machine of the type having a spindle that defines a longitudinal axis with a horizontal plane passing therethrough, and including an endworking attachment that is secured to the automatic screw machine, the endworking attachment having a recess that defines a centerline that intersects the horizontal plane at an angle of approximately 83 degrees,
- a box turning tool fed by the endworking attachment to cut a workpiece rotating about the spindle longitudinal axis without rubbing on the workpiece comprising:
    - a. a shank clamped in the endworking attachment recess, the shank having opposed leading and trailing sides and opposed connecting sides, the shank defining a central longitudinal plane extending between the leading and trailing sides and a central transverse plane extending between the connecting sides, the shank having an insert seat that lies in a plane that makes an angle of approximately 83 degrees with the shank central longitudinal plane such that the shank insert seat is parallel to the horizontal plane through the automatic screw machine spindle axis;
    - b. an indexable carbide insert located on the shank insert seat and having a cutting edge that is coincident with the horizontal plane through the automatic screw machine spindle axis, and a cutting tip that cooperates with the cutting edge to cut a surface of the workpiece that is in instantaneous contact with the cutting edge when the endworking attachment is fed relative to the workpiece in a direction parallel to the spindle longitudinal axis and from the shank trailing side toward the shank leading side, wherein the indexable carbide insert is triangular-shaped and is located on the shank insert seat by a pair of guide surfaces that locate the indexable carbide insert symmetrically about an insert seat longitudinal centerline, the guide surfaces extending parallel to each other from the shank trailing side to respective terminal points, the guide surfaces diverging from each other from the respective terminal points toward the shank connecting sides, wherein the shank insert seat longitudinal centerline makes an angle of approximately one degree to five degrees with the shank central longitudinal plane; and
    - c. screw means for removably mounting the indexable carbide insert on the shank insert seat,
        so that the velocity of the workpiece surface that is in instantaneous contact with the indexable carbide insert cutting edge is in a direction perpendicular to the cutting edge to thereby produce proper cutting action on the workpiece without modification to the endworking attachment or the automatic screw machine.

2. Apparatus for turning a workpiece comprising;
- a. an automatic screw machine that rotates the workpiece about a longitudinal axis having a horizontal plane therethrough;
- b. an endworking attachment having a recess that defines a centerline that makes an 83 degree angle with the horizontal plane through the automatic screw machine longitudinal axis; and
- c. a box turning tool clamped in the endworking attachment and fed thereby in a direction parallel to the longitudinal axis to turn the workpiece, the box turning tool comprising;
    - i. a shank clamped in the endworking attachment recess and defining a central longitudinal plane that is parallel to the automatic screw machine longitudinal axis and that intersects the horizontal plane at an angle of 83 degrees, the shank having a leading side and a trailing side that are perpendicular to the shank central longitudinal plane and opposed connecting sides, the endworking attachment feeding the box turning tool in a direction from the shank trailing side toward the shank leading side, the shank having an insert seat that lies in a plane that is parallel to the horizontal plane;
    - ii. an indexable carbide insert located on the shank insert seat and having a cutting edge and a cutting tip that contact the workpiece and that are coincident with the horizontal plane through the longitudinal axis; and
    - iii. screw means for removably mounting the indexable carbide insert to the shank insert seat.

3. The apparatus of claim 2 wherein:
- a. the insert seat defines a longitudinal centerline extending between the shank trailing and leading sides; and
- b. the indexable carbide insert is triangular-shaped having at least one cutting edge and is located on the shank insert seat symmetrically about the insert seat longitudinal centerline by a pair of guide surfaces that are symmetrical about the insert seat longitudinal centerline, the pair of guide surfaces comprising first surfaces that are spaced a predetermined distance apart from each other and that extend from the shank trailing side parallel to each other to respective terminal points, and second surfaces that diverge toward the shank connecting sides from the respective terminal points.

4. The apparatus of claim 3 wherein:
- a. the insert seat longitudinal centerline lies in the shank central longitudinal plane; and
- b. the indexable carbide insert cutting edge is perpendicular to the automatic screw machine longitudinal axis.

5. The apparatus of claim 3 wherein:
- a. the insert seat longitudinal centerline makes an angle of approximately one degree to five degrees with the shank central longitudinal plane; and
- b. the indexable carbide insert cutting edge is not perpendicular to the automatic screw machine longitudinal axis.

6. The apparatus of claim 3 wherein the insert seat longitudinal centerline is parallel to the shank central longitudinal plane.

7. A box turning tool for turning a workpiece about a spindle axis of a Greenlee automatic screw machine with an endworking attachment, the box turning tool comprising:
- a. a triangular-shaped indexable carbide insert having a cutting edge and a cutting tip; and
- b. a shank having a rectangular cross section with opposed leading and trailing sides and opposed connecting sides, the shank defining a central longitudinal plane extending between the leading and trailing sides, the shank having an insert seat that lies in a plane that makes an angle of 83 degrees with the central longitudinal plane, the indexable carbide insert being located on the shank insert seat such that the cutting edge overhangs the shank leading side, the box turning tool shank being clampable and adjustable in the endworking attachment to locate the indexable carbide insert cutting edge within a horizontal plane passing through the automatic screw machine spindle axis.

8. The box turning tool of claim 7 wherein the shank is formed with a pair of guide surfaces that locate the indexable carbide insert on the shank insert seat, the guide surfaces being symmetrical about a longitudinal centerline, the guide surfaces having respective first surfaces that extend parallel to each other from the shank trailing side to respective terminal points and from the terminal points to the shank connecting sides.

9. The box turning tool of claim 8 wherein the longitudinal centerline of the shank insert seat makes an angle of approximately one degree to five degrees with the shank central longitudinal plane.

10. The box turning tool of claim 8 wherein the longitudinal centerline of the shank insert seat is parallel to but does not lie within the shank central longitudinal plane.

11. The box turning tool of claim 8 wherein the guide surfaces of the shank insert seat make an angle of approximately seven degrees with the shank central longitudinal plane.

12. The box turning tool of claim 8 wherein the longitudinal centerline of the shank insert seat lies within the shank central longitudinal plane.

13. A method of machining a workpiece in a Greenlee automatic screw machine having a longitudinal axis comprising the steps of:
   a. providing a shank having leading and trailing sides and defining a central longitudinal plane extending between the leading and trailing sides and further defining an insert seat that makes an angle of approximately 83 degrees with the central longitudinal plane;
   b. mounting an indexable carbide insert having a cutting edge and a cutting tip on the shank insert seat and overhanging the indexable carbide insert cutting edge over the shank leading side;
   c. securing to the automatic screw machine an endworking attachment having a recess that defines a centerline that intersects a horizontal plane through the automatic screw machine longitudinal axis at an angle of 83 degrees;
   d. clamping the shank in the endworking attachment recess;
   e. adjusting the shank in the endworking attachment recess to bring the indexable carbide insert cutting edge into coincidence with the horizontal plane through the automatic screw machine longitudinal axis; and
   f. feeding the endworking attachment to bring the indexable carbide insert cutting edge and cutting tip into machining contact with the workpiece.

14. The method of claim 13 wherein:
   a. the step of mounting the indexable carbide insert on the shank insert seat comprises the step of mounting the indexable carbide insert on the shank insert seat such that the cutting edge thereof is not parallel to the shank leading side; and
   b. the step of feeding the endworking attachment comprises the step of feeding the indexable carbide insert cutting edge and cutting tip into the workpiece in a direction from the shank trailing side toward the shank leading side such that the cutting tip leads the cutting edge and thereby machines an undercut in a face of the workpiece.

15. The method of claim 13 wherein:
   a. the step of mounting the indexable carbide insert on the shank insert seat comprises the step of mounting the indexable carbide insert on the shank insert seat such that the cutting edge thereof is not parallel to the shank leading side; and
   b. the step of feeding the endworking attachment comprises the step of feeding the indexable carbide insert cutting edge and cutting tip into the workpiece in a direction from the shank trailing side toward the shank leading side such that the cutting tip trails the cutting edge and thereby prevents a ring of material from breaking off the workpiece at the end of a selected turning operation.

16. In an automatic screw machine of the type having a spindle that defines a longitudinal axis with a horizontal plane passing therethrough, and including an endworking attachment that is secured to the automatic screw machine, the endworking attachment having a recess that defines a centerline that intersects the horizontal plane at an angle of 90 degrees,
   a box turning tool fed by the endworking attachment to cut a workpiece rotating about the spindle longitudinal axis without rubbing on the workpiece comprising:
      a. a shank clamped in the endworking attachment recess, the shank having opposed leading and trailing sides and opposed connecting sides, the shank defining a central longitudinal plane extending between the leading and trailing sides and a central transverse plane extending between the connecting sides, the shank having an insert seat that lies in a plane that makes an angle of 90 degrees with the shank central longitudinal plane such that the shank insert seat is parallel to the horizontal plane through the automatic screw machine spindle axis, the shank having a pair of guide surfaces upstanding from the insert seat that are symmetrical about a longitudinal centerline, the guide surfaces extending parallel to each other from the shank trailing side to respective terminal points, the guide surfaces diverging from each other from the respective terminal points toward the shank connecting sides, the insert seat longitudinal centerline making an angle of approximately one degree to five degrees with the shank central longitudinal plane;
      b. an indexable carbide insert located on the shank insert seat and having a cutting edge that is coincident with the horizontal plane through the automatic screw machine spindle axis, and a cutting tip that cooperates with the cutting edge to cut a surface of the workpiece that is in instantaneous contact with the cutting edge when the endworking attachment is fed relative to the workpiece in a direction parallel to the spindle longitudinal axis and from the shank trailing side toward the shank leading side; and
      c. screw means for removably mounting the indexable carbide insert on the shank insert seat.

17. Apparatus for turning a workpiece comprising:
   a. an automatic screw machine that rotates the workpiece about a longitudinal axis having a horizontal plane therethrough;
   b. an endworking attachment having a recess that defines a centerline that makes a 90 degree angle with the horizontal plane through the automatic screw machine longitudinal axis; and
   c. a box turning tool clamped in the endworking attachment and fed thereby in a direction parallel to the longitudinal axis to turn the workpiece, the box turning tool comprising:

i. a shank clamped in the endworking attachment recess and defining a central longitudinal plane that is parallel to the automatic screw machine longitudinal axis and that intersects the horizontal plane at an angle of 90 degrees, the shank having a leading side and a trailing side that are perpendicular to the shank central longitudinal plane and opposed connecting sides, the endworking attachment feeding the box turning tool in a direction from the shank trailing side toward the shank leading side, the shank having an insert seat that lies in a plane that is parallel to the horizontal plane, the insert seat defining a longitudinal centerline that extends between the shank trailing and leading sides and that makes an angle of approximately one degree to five degrees with the shank central longitudinal plane, the shank having a pair of guide surfaces that are symmetrical about the insert seat longitudinal centerline, the pair of guide surfaces comprising first surfaces that are spaced a predetermined distance apart from each other and that extend from the shank trailing side parallel to each other to respective terminal points, and second surfaces that diverge toward the shank connecting sides from the respective terminal points;

ii. an indexable carbide insert located on the shank insert seat and having a cutting edge and a cutting tip that contact the workpiece and that are coincident with the horizontal plane through the longitudinal axis; and iii. screw means for removably mounting the indexable carbide insert to the shank insert seat.

18. A box turning tool for turning a workpiece about a spindle axis of a selected automatic screw machine with an endworking attachment, the box turning tool comprising:

a. a triangular-shaped indexable carbide insert having a cutting edge and a cutting tip; and b. a shank having a rectangular cross section with opposed leading and trailing sides and opposed connecting sides, the shank defining a central longitudinal plane extending between the leading and trailing sides, the shank having an insert seat that lies in a plane that makes an angle of 90 degrees with the central longitudinal plane, the shank being formed with a pair of guide surfaces that locate the indexable carbide insert on the shank insert seat, the guide surfaces being symmetrical about a longitudinal centerline that makes an angle of approximately one degree to five degrees with the shank central longitudinal plane, the guide surfaces having respective first surfaces that extend parallel to each other from the shank trailing side to respective terminal points and from the terminal points to the shank connecting sides, the indexable carbide insert being located on the shank insert seat such that the cutting edge overhangs the shank leading side, the box turning tool shank being clampable and adjustable in the endworking attachment to locate the indexable carbide insert cutting edge within a horizontal plane passing through the automatic screw machine spindle axis.

19. A method of machining a workpiece in a Greenlee automatic screw machine having a longitudinal axis comprising the steps of:

a. providing a shank having leading and trailing sides and defining a central longitudinal plane extending between the leading and trailing sides and further defining an insert seat that makes an angle of 90 degrees with the central longitudinal plane;

b. mounting an indexable carbide insert having a cutting edge and a cutting tip on the shank insert seat and overhanging the indexable carbide insert cutting edge over the shank leading side and such that the cutting edge is not parallel to the shank leading side;

c. securing to the automatic screw machine an endworking attachment having a recess that defines a centerline that intersects a horizontal plane through the automatic screw machine longitudinal axis at an angle of 90 degrees;

d. clamping the shank in the endworking attachment recess;

e. adjusting the shank in the endworking attachment recess to bring the indexable carbide insert cutting edge into coincidence with the horizontal plane through the automatic screw machine longitudinal axis; and f. feeding the endworking attachment to bring the indexable carbide insert cutting edge and cutting tip into machining contact with the workpiece in a direction from the shank trailing side toward the shank leading side such that the cutting tip leads the cutting edge and thereby machines an undercut in a face of the workpiece.

20. A method of machining a workpiece in a Greenlee automatic screw machine having a longitudinal axis comprising the steps of:

a. providing a shank having leading and trailing sides and defining a central longitudinal plane extending between the leading and trailing sides and further defining an insert seat that makes an angle of 90 degrees with the central longitudinal plane;

b. mounting an indexable carbide insert having a cutting edge and a cutting tip on the shank insert seat and overhanging the indexable carbide insert cutting edge over the shank leading side and such that the cutting edge is not parallel to the shank leading side;

c. securing to the automatic screw machine an endworking attachment having a recess that defines a centerline that intersects a horizontal plane through the automatic screw machine longitudinal axis at an angle of 90 degrees;

d. clamping the shank in the endworking attachment recess;

e. adjusting the shank in the endworking attachment recess to bring the indexable carbide insert cutting edge into coincidence with the horizontal plane through the automatic screw machine longitudinal axis; and f. feeding the endworking attachment to bring the indexable carbide insert cutting edge and cutting tip into machining contact with the workpiece in a direction from the shank trailing side toward the shank leading side such that the cutting tip trails the cutting edge and thereby prevents a ring of material from breaking off the workpiece at the end of a selected turning operation.

* * * * *